(12) United States Patent
Edwards

(10) Patent No.: US 8,810,097 B2
(45) Date of Patent: Aug. 19, 2014

(54) MAGNETIC GEAR ARRANGEMENT

(75) Inventor: Huw L. Edwards, Derby (GB)

(73) Assignee: Rolls-Royce PLC, London (GB)

( * ) Notice: Subject to any disclaimer, the term of this patent is extended or adjusted under 35 U.S.C. 154(b) by 443 days.

(21) Appl. No.: 13/003,954

(22) PCT Filed: Jul. 2, 2009

(86) PCT No.: PCT/EP2009/004785
§ 371 (c)(1),
(2), (4) Date: Jan. 13, 2011

(87) PCT Pub. No.: WO2010/017860
PCT Pub. Date: Feb. 18, 2010

(65) Prior Publication Data
US 2011/0121673 A1    May 26, 2011

(30) Foreign Application Priority Data
Aug. 11, 2008  (GB) .................................. 0814547.6

(51) Int. Cl.
| | |
|---|---|
| H02K 19/36 | (2006.01) |
| H02K 49/12 | (2006.01) |
| H02K 5/22 | (2006.01) |
| H02K 49/10 | (2006.01) |
| H02K 7/11 | (2006.01) |

(52) U.S. Cl.
CPC ................ *H02K 49/102* (2013.01); *H02K 7/11* (2013.01)
USPC ........... 310/103; 310/104; 310/114; 310/68 R

(58) Field of Classification Search
CPC ....................................................... H02K 5/225
USPC ......................................... 310/103, 104, 114
See application file for complete search history.

(56) References Cited

U.S. PATENT DOCUMENTS 3,889,140 A   6/1975  Baermann
3,898,490 A * 8/1975  Wedman ......................... 310/52
(Continued)

FOREIGN PATENT DOCUMENTS

| DE | 10 2005 031 413 A1 | 1/2007 | |
|---|---|---|---|
| GB | 2 447 592 A | 9/2008 | |
| WO | WO 2007/107691 A1 | 9/2007 | |
| WO | WO2007107691 * | 9/2007 | ............ H02K 49/10 |
| WO | WO 2007/135360 A1 | 11/2007 | |

OTHER PUBLICATIONS

Atallah et al., "Design, analysis and realisation of a high-performance magnetic gear," *SIEE Proceedings—Electric Power*, vol. 151, Pt. 2, pp. 135-143, 2004.

(Continued)

*Primary Examiner* — Terrance Kenerly
(74) *Attorney, Agent, or Firm* — Oliff PLC

(57) ABSTRACT

A magnetic gear arrangement is provided having a first gear member that generates a first magnetic field and a second gear member that generates a second magnetic field. A plurality of interpoles are disposed between the two gear members for coupling the first and second magnetic fields to control a gear ratio between the gear members. At least one interpole has wiring associated with it that can be activated to alter the magnetic flux at the interpole, so as to vary the coupling between the first and second magnetic fields. The wiring is electrically connected to an electronic filter, which modifies the current passing through the wiring, so as to modify the influence of the wiring on the magnetic flux at the interpole.

28 Claims, 3 Drawing Sheets

(56) References Cited

U.S. PATENT DOCUMENTS

| | | | |
|---|---|---|---|
| 4,459,571 A * | 7/1984 | Fraser | 333/202 |
| 4,896,064 A * | 1/1990 | Taiani | 310/104 |
| 6,787,931 B2 * | 9/2004 | Nakagawa et al. | 290/31 |
| 6,794,781 B2 | 9/2004 | Razzell et al. | |
| 2007/0040525 A1 * | 2/2007 | Brown | 318/439 |
| 2007/0186692 A1 * | 8/2007 | Waszak et al. | 73/862.331 |
| 2008/0143109 A1 * | 6/2008 | Pitchford et al. | 290/43 |

OTHER PUBLICATIONS

British Search Report issued in Application No. 0814547.6; Dated Dec. 9, 2008.

Written Opinion of the International Searching Authority issued in Application No. PCT/EP2009/004785; Dated Oct. 19, 2009.

International Search Report issued in Application No. PCT/EP2009/004785; Dated Oct. 19, 2009.

\* cited by examiner

MAGNETIC GEAR ARRANGEMENT

The present invention relates to magnetic gear arrangements, particularly magnetic gear arrangements having a variable gear ratio.

Gearboxes and gear arrangements are utilised in a wide range of situations in order to couple drive mechanisms. Traditionally, gearboxes have been formed from gear wheels having appropriate teeth numbers and sizes to provide a desired gear ratio. However, such gearboxes have a number of disadvantages. Firstly, they require the use of lubricating oils, which may act as contaminants or fire hazards and may prove ineffective in hot or cold environments, where the oil viscosity varies, or in a low pressure environment, where the oil may evaporate. Furthermore, gearboxes based on gear wheels may be noisy, making them unacceptable for low noise environments such as in hospitals, libraries and residential areas, or for clandestine military activities.

More recently, magnetic gearboxes have been provided which comprise respective gear rotors with interpoles between them. The rotors incorporate permanent magnets, and the interpoles, or pole members or elements, act to modulate the magnetic flux transferred between the gear rotors. Such magnetic gearboxes enable a speed-changing mechanical device to be provided in which there is no mechanical contact between input and output shafts, thus avoiding many of the problems of noise and wear that arise in gearboxes having contacting moving parts.

FIG. 1 shows a schematic plan view of a typical magnetic gear arrangement of the prior art. The magnetic gear arrangement 100 is an epicyclic gearbox and comprises an inner rotor 120 and an outer rotor 160. Permanent magnets 140,180 are fixed to the inner and outer rotors 120,160. The permanent magnets 140 affixed to the inner rotor 120 have alternating polarity along the circumference of the rotor. Similarly, the permanent magnets 180 affixed to the outer rotor 160 have alternating polarity along the circumference of that rotor. Typically, one rotor is mechanically coupled to a drive mechanism and the other rotor is mechanically coupled to a driven mechanism.

The inner and outer rotors 120,160 have different numbers of permanent magnets 140,180. Typically, the number of permanent magnets affixed to the outer rotor 160 is greater than that affixed to the inner rotor 120.

Interpoles 200 are provided between the inner rotor 120 and the outer rotor 160 and form an array having a cylindrical shape.

The interpoles 200 modulate the magnetic field produced by the inner rotor 120 and the magnetic field produced by the outer rotor 160, so as to couple the two fields and hence the motion of the rotors. The number of interpoles is a factor in determining the gear ratio of the magnetic gearbox.

The motion of the rotors 120,160 may be either co-rotational or counter-rotational, depending on the number of magnets affixed to each rotor and the number of interpoles.

WO2007/107691 describes a magnetic gearbox arrangement in which coils of electrically-conductive wire are wound around the interpoles. By selectively short-circuiting these coils, the magnetic flux around particular interpoles may be reduced significantly, thus diminishing the modulation capacity of the selected interpoles and effectively removing them from service. Thus, it is possible to change the number and arrangement of active interpoles in the gearbox, in order to modify the gear ratio as required.

In general terms, the present invention provides a magnetic gear arrangement in which the modulation capacity of at least one interpole is modified by respective wiring, the wiring being connected to an electronic filter for e.g. optimising the magnetic field within the gear arrangement.

An aspect of the present invention provides a magnetic gear arrangement comprising a first gear member for generating a first magnetic field, a second gear member for generating a second magnetic field, and a plurality of interpoles disposed therebetween, for coupling said first magnetic field and said second magnetic field to control a gear ratio between said first gear member and said second gear member, wherein at least one interpole comprises wiring and a switch to activate said wiring, such that activation of said wiring alters the magnetic flux at said interpole so as to vary the coupling between said first magnetic field and said second magnetic field, said wiring being electrically connected to an electronic filter, which modifies the current passing through said wiring, so as to modify the influence of said wiring on the magnetic flux at said interpole.

By using electronic filters in conjunction with wirings, magnetic fields may be generated that provide more efficient coupling of the first and second gear members, thus improving the performance of the magnetic gear arrangement.

For example, the filters may serve to increase the symmetry of the magnetic fields within the gear arrangement, thus restricting the formation of parasitic torques that may reduce the performance of the gear arrangement.

The filters may also be used to change the relative strength of certain components of the magnetic field e.g. the fundamental component or a harmonic component. This may allow gear ratios to be selected from a wide range, each gear ratio being defined by either the fundamental component of the magnetic field or by a selected harmonic component.

Typically, the wiring is a coil wound around the interpole.

The magnetic gear arrangement may have a fixed gear ratio. However, the magnetic gear arrangement is generally configured so that a variation in coupling of the first and second magnetic fields varies the gear ratio of the arrangement i.e. the magnetic gear arrangement may have a variable gear ratio.

Typically, the electronic filter is configured to filter out a component of the magnetic flux at the interpole. It has been found that harmonic components of the magnetic fields present within a magnetic gear arrangement may cause parasitic torques that result in the lower efficiency of the gear arrangement. Thus, the electronic filter may be configured to filter out a harmonic component.

In this case, the magnetic gear arrangement may further be configured so as to generate power from the filtered component of the magnetic field, thus increasing the overall efficiency of the gear arrangement.

The first and second gear members are typically gear rotors. It has been found that in gear arrangements having gear rotors, use of wiring to alter the magnetic flux at an interpole may result in a reduction in rotational symmetry of the magnetic field within the gear arrangement. This may cause harmonic magnetic fields to be introduced into the gear arrangement, which may result in the generation of parasitic torques that lower its efficiency. Thus, in gear arrangements having gear rotors as the first and second members, the electronic filter is typically configured to filter out harmonic components of the magnetic field arising e.g. from a lack of rotational symmetry of the magnetic field.

The electronic filter may be a variable filter. This may allow different components of the magnetic field to be filtered, or may allow the level of filtering to be varied. Alternatively, the wiring may be connected to more than one electronic filter to provide variable filtering effects. In either of these cases, the magnetic gear arrangement may be provided with a control system for controlling the operation of the variable filter or the plurality of filters.

The control system may allow different filtering effects to be provided in response to different modes of operation of the magnetic gear arrangement. For example, different filtering effects may be provided in response to different gear ratios of the magnetic gear arrangement or at different speeds of the gear members.

The control system may include one or more magnetic sensors. Each of the one or more magnetic sensors may monitor the magnetic field in the gear arrangement so that the control system may provide an appropriate response from the electronic filter(s).

The magnetic gear arrangement may include a variable impedance connected to the wiring. The impedance may be varied in order to further vary the magnetic flux at an interpole, so as to vary the coupling between the first and second magnetic fields. The impedance may provide a load for producing a braking effect on either or both the first and second gear members of the gear arrangement.

The electronic filter may be an active filter e.g. one including an active device such as an operational amplifier. Such a filter may provide external power to the wiring, which then transfers this power to the magnetic fields controlling the gear arrangement. This power may be used to increase the relative strength of a given component of the magnetic field. For example, the strength of a harmonic component of the magnetic field may be increased, so that this component controls the gear ratio of the gear arrangement. By allowing the gear ratio to be controlled by the harmonic component of the magnetic field, it is possible to increase the range of gear ratios that are available to the magnetic gear arrangement.

If the gear ratio is controlled by a harmonic component of the magnetic field, it is desirable to reduce the strength of the fundamental component of the field. This effect may also be achieved by an electronic filter connected to the wiring.

The magnetic gear arrangement of the invention may have a number of different configurations, such as an epicyclic gearbox or an in-line disc arrangement such as that described in WO2007/135360. The magnetic gear arrangement may also take the form of a linear actuator having elongate, aligned gear members, or a tubular actuator comprising one elongate gear member held within a tubular gear member.

The magnetic fields generated by the gear members of the gear arrangement may result from permanent magnets or electrical windings associated with the gear members.

Embodiments of the invention will now be described by way of example with reference to the accompanying drawings in which.

Figure 1:
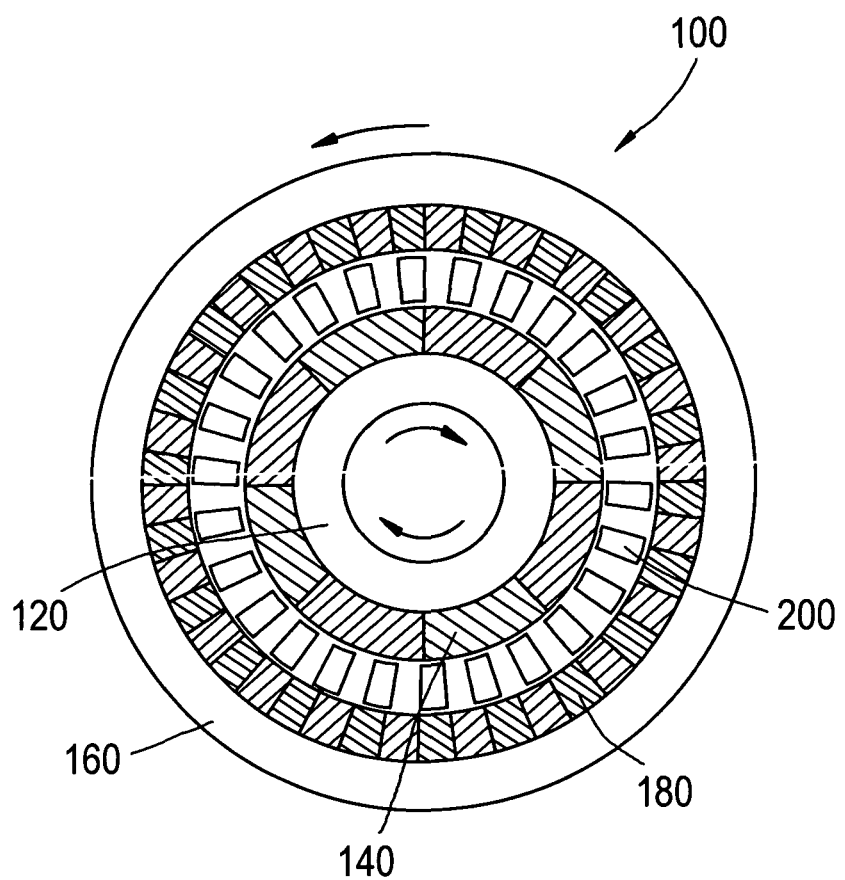
FIG. 1 shows a schematic plan view of a gearbox of the prior art.
Figure 2:
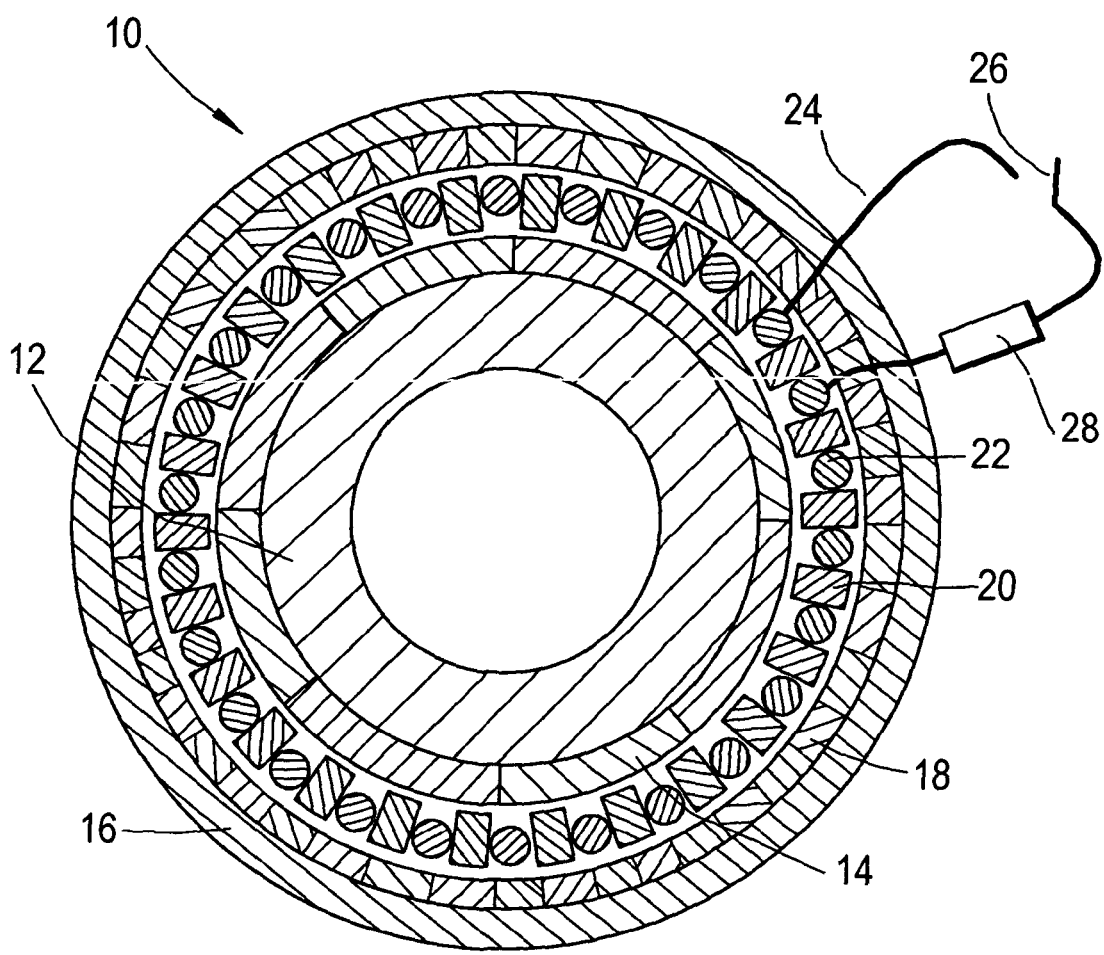
FIG. 2 shows a schematic plan view of a gearbox according to the present invention.

FIG. 2 shows a schematic plan view of a magnetic gear arrangement of the present invention. The magnetic gearbox 10 is an epicyclic gearbox and comprises an inner rotor 12 and an outer rotor 16. Permanent magnets 14,18 are fixed to the inner and outer rotors 12,16. The permanent magnets 14 affixed to the inner rotor 12 have alternating polarity along the circumference of the rotor.

Similarly, the permanent magnets 18 affixed to the outer rotor 16 have alternating polarity along the circumference of that rotor. Typically, one rotor is mechanically coupled to a drive mechanism and the other rotor is mechanically coupled to a driven mechanism.

The inner and outer rotors 12,16 have different numbers of permanent magnets 14,18. Typically, the number of permanent magnets affixed to the outer rotor 16 is greater than that affixed to the inner rotor 12.

Interpoles 20 are provided between the inner rotor 12 and the outer rotor 16, and form an array having a cylindrical shape. Typically, the interpoles are made of a magnetically soft material, such as electrical steel. The interpoles may also be laminated to restrict the formation of eddy currents.

The interpoles 20 modulate the magnetic field produced by the inner rotor 12 and the magnetic field produced by the outer rotor 16, so as to couple the two fields and hence the motion of the rotors. The number of interpoles is a factor in determining the gear ratio of the magnetic gearbox.

The motion of the rotors 12,16 may be either co-rotational or counter-rotational, depending on the number of magnets affixed to each rotor and the number of interpoles.

The interpoles 20 have wiring associated with them, the wiring in the embodiment of FIG. 2 being in the form of coils 22 or windings about the interpoles.

Furthermore, as shown by line 24 as an example, each coil 22 forms part of a circuit 24 having a switch 26 that can at least provide an open circuit or closed circuit configuration for the coil 22. In such circumstances, dependent on the state of the switch 26 there is a variation of the magnetic flux transfer capabilities of the associated coil 22. If the switch is closed, the short-circuited coil reduces the magnetic flux at the associated interpole 20. This reduction in magnetic flux greatly diminishes the modulation effect of the interpole 20, thus affecting modulation and coupling of the magnetic fields generated by the rotors 12,16. The effective gear ratio is therefore changed due to changes in the level of magnetic flux modulation.

It will be understood that when the switch 26 is opened across the coil 22, the magnetic flux modulation ability of the interpoles 20 is much greater and so a different level of magnetic modulation between the inner and outer rotors 12,16 will be achieved, resulting in a different effective gear ratio to when the switch across the coil 22 is closed.

Effectively, the function of the coil 22 and the associated circuit 24 is to modify the capacity of the interpole 20 to modulate the magnetic field from the inner and outer rotors 12,16, thereby allowing the gear ratio of the magnetic gearbox to be varied.

The coils 22 may be activated individually through their respective switch 26, or groups of switches 26 may be consolidated so that groups of coils 22 may be activated simultaneously. Thus, the magnetic field between the inner and outer rotors 12,16 may be variably modulated by selective switching of the open or closed circuit status of the coils 22 in order to achieve different effective gear ratios between the rotors 12,16.

The circuits 24 across coils 22 each further comprise an electronic filter 28. The electronic filter 28 is connected in series with the coil 22 and is used to modify the current passing through the coil 22 by either removing unwanted components of that current or enhancing desirable components. Thus the electronic filter 28 works in conjunction with the coil 22 to modify the capacity of the interpole 20 to modulate the magnetic field from the inner and outer rotors 12,16.

Figure 3:
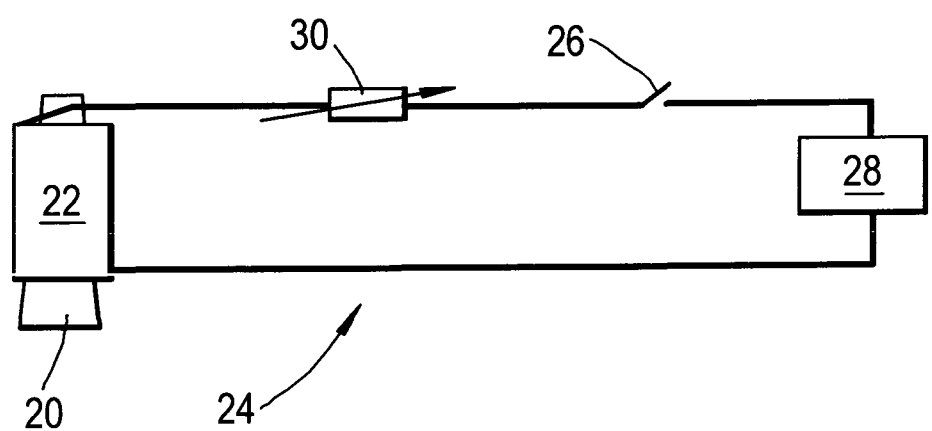
FIG. 3 is a schematic illustration of the circuit associated with the gearbox of FIG. 2.

FIG. 3 shows a schematic diagram of a circuit 24 across a coil 22. The coil 22 is wound around an interpole 20. The circuit is operated via a switch 26 and may include an impedance 30.

Typically, the effect of the electronic filter 28 is to modify the relative strengths of different components of the magnetic field within the gearbox. Thus, the relative strength of fundamental or harmonic components of the magnetic field may be increased or reduced.

For example, the electronic filter 28 may be used to reduce harmonic magnetic fields within the gearbox. Harmonic magnetic fields are often undesirable since they may introduce parasitic torques into the magnetic gearbox. Harmonic magnetic fields may result when the rotational symmetry of the magnetic gearbox is low or entirely missing, e.g. as a result of the interpoles 20 having non-uniform modulation capacities.

Effectively, in this case, the presence of a filter 28 connected in series with the coil 22 would allow the coil 22 to change the way the magnetic field is modulated by the interpoles 20, while enabling the removal of any unwanted harmonic components of the magnetic field. The filter 28 may provide a low impedance path for such harmonic components, allowing them to be removed from the main magnetic field and so reducing their influence on the coupling of the inner and outer rotors 12,16.

The harmonic components filtered out from the magnetic field may be used to generate electrical power. In this way, the overall efficiency of the magnetic gearbox may be increased, not only through the reduction of the parasitic torques resulting from the harmonic magnetic field, but also through the generation of electrical power.

Alternatively, the electronic filter 28 may be used to filter out the fundamental component of the magnetic field within the gearbox, so that the gear ratio of the gearbox is determined by one of the harmonic magnetic fields within the gearbox, and in particular, by the number of poles of that harmonic magnetic field. Thus, it would be possible to achieve gear changing through harmonic working, increasing the range of gear ratios attainable by the gearbox.

The electronic filter 28 may be active or passive. Active filters contain amplifying components. An active filter would allow power to be inputted into the interpoles, for example, to reinforce a component of the magnetic field. Thus, for example, the filter could be used to reinforce harmonic components of the magnetic field within the gearbox, so that these harmonic components become dominant.

Typically, the electronic filters 28 will comprise various combinations of known electronic components such as resistors, capacitors, and inductors. The components may have fixed characteristics. Alternatively the components may have variable or controllable characteristics. The electronic filter 28 may be a variable filter. Alternatively, the circuit 24 may have a plurality of filters, for example, in the form of a switched filter bank. Thus, the type or level of filtration of the electronic signal may be selected as required, for example, in response to the speed of the rotors 12,16.

When the magnetic gearbox comprises a variable filter or a plurality of filters, the magnetic gearbox may also comprise a control system for controlling the electronic filters 28. Such a control system may comprise a magnetic field sensor, such as a search coil or a Hall effect device. The control system provides feedback for the operation of the electronic filter 28. For example, the electronic filters 28 may be activated at a predetermined speed of the rotors 12,16 by the control system.

Alternatively, the control system for a variable filter may be based on the speed of the magnetic gearbox. In this case, the control system may use data obtained from pre-testing of the gearbox: this data may provide a correlation between the speed of the gearbox and the magnetic fields generated within it.

In another configuration of the magnetic gearbox, one filter may be shared between several circuits 24.

The circuit 24 may include an impedance 30 to further adjust the magnetic flux modulation capacity of the coils 22 around the interpoles 20. This impedance may be varied in order to control the gear ratio of the magnetic gearbox and therefore provide effective gear ratios over a range from, for example, effective open circuit to effective closed circuit. Alternatively, the impedance may be fixed so that the switch provides three configurations: open, impedance load and closed. In such circumstances, the switch may be any device capable of switching, such as a relay or semi-conducting device.

Effectively, the impedance may provide an electromagnetic braking force to slow down the output gear of the magnetic gearbox i.e. one of the inner and outer rotors 12,16. By slowing the output gear, the gear ratio of the magnetic gearbox may be varied.

Although in this embodiment, the interpole member 20 remains stationary relative to the gearbox as a whole, it may be possible to provide an alternative configuration in which the interpole member 20 is allowed to rotate and either the inner rotor 12 or the outer rotor 16 remains stationary. This configuration could be achieved by providing an appropriate slip switching mechanism for the conducting circuits 24. The slip switching mechanism typically comprises at least one slip ring or commutator, and, optionally a brush.

The magnetic gear arrangement of the present invention may be realised in a number of different configurations. For example, the gear members may be gear rotors that are coaxial and are displaced along their axis of rotation. Alternatively, the magnetic gear arrangement may be a linear actuator, having elongate gear members that are aligned with each other and separated by interpoles. The gear arrangement may also be a tubular actuator having one elongate gear member held within a tubular gear member, interpoles being provided between them.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A magnetic gear arrangement comprising:
   a first gear member for generating a first magnetic field,
   a second gear member for generating a second magnetic field, and
   a plurality of interpoles disposed between the first gear member and the second gear member for coupling said first magnetic field and said second magnetic field to control a gear ratio between said first gear member and said second gear member, wherein
   at least one interpole comprises wiring and a switch to activate said wiring, such that activation of said wiring alters the magnetic flux at said interpole so as to vary the coupling between said first magnetic field and said second magnetic field,
   said wiring is electrically connected to an electronic filter, which modifies the current passing through said wiring, so as to modify the influence of said wiring on the magnetic flux at said interpole, said electronic filter is a variable filter, and the magnetic gear arrangement further comprises a control system for controlling the operation of the electronic filter, the control system comprising at least one magnetic field sensor to monitor the magnetic field in the magnetic gear arrangement, and the control system is configured to provide feedback from the at least one magnetic field sensor to the electronic filter.

2. A magnetic gear arrangement according to claim 1, wherein said wiring is a coil.

3. A magnetic gear arrangement according to claim 1, wherein a variation in said coupling varies the gear ratio between said first gear member and said second gear member.

4. A magnetic gear arrangement according to claim 1, wherein said first gear member and said second gear member are both gear rotors.

5. A magnetic gear arrangement according to claim 1, wherein said wiring is further electrically connected to an additional electronic filter.

6. A magnetic gear arrangement according to claim 1, wherein said wiring is connected to an impedance.

7. A magnetic gear arrangement according to claim 1, further comprising means for applying a voltage across said electronic filter.

8. A magnetic gear arrangement according to claim 1, wherein said electronic filter is configured to filter out a component of the magnetic flux at said interpole.

9. A magnetic gear arrangement according to claim 8, wherein said component of the magnetic flux is a fundamental component.

10. A magnetic gear arrangement according to claim 8, said magnetic gear arrangement being configured to generate power from said filtered component of the magnetic flux.

11. A magnetic gear arrangement according to claim 1, wherein the first gear member comprises permanent magnets and the second gear member comprises permanent magnets.

12. A magnetic gear arrangement as claimed in claim 1, wherein the electronic filter is configured to select a harmonic component of the magnetic flux.

13. A magnetic gear arrangement comprising:
a first gear member for generating a first magnetic field,
a second gear member for generating a second magnetic field, and
a plurality of interpoles disposed between the first gear member and the second gear member for coupling said first magnetic field and said second magnetic field to control a gear ratio between said first gear member and said second gear member, wherein
at least one interpole comprises wiring and a switch to activate said wiring, such that activation of said wiring alters the magnetic flux at said interpole so as to vary the coupling between said first magnetic field and said second magnetic field,
said wiring is electrically connected to an electronic filter, which modifies the current passing through said wiring, so as to modify the influence of said wiring on the magnetic flux at said interpole,
said electronic filter is a variable filter,
said first gear member and said second gear member are both gear rotors, and
the magnetic gear arrangement further comprising a control system for controlling the operation of the electronic filter, the control system comprising at least one magnetic field sensor to monitor the magnetic field in the magnetic gear arrangement, the control system is configured to provide feedback from the at least one magnetic field sensor to the electronic filter, and the control system is configured to activate the electronic filter at a predetermined speed of the gear rotors.

14. A magnetic gear arrangement comprising:
a first gear member for generating a first magnetic field,
a second gear member for generating a second magnetic field, and
a plurality of interpoles disposed between the first gear member and the second gear member for coupling said first magnetic field and said second magnetic field to control a gear ratio between said first gear member and said second gear member, wherein
at least one interpole comprises wiring and a switch to activate said wiring, such that activation of said wiring alters the magnetic flux at said interpole so as to vary the coupling between said first magnetic field and said second magnetic field, and
said wiring is electrically connected to an electronic filter, which modifies the current passing through said wiring, so as to modify the influence of said wiring on the magnetic flux at said interpole, the electronic filter is an active filter, the active filter is configured to provide power to the wiring, and the active filter is configured to increase the strength of a harmonic component of the magnetic flux.

15. A magnetic gear arrangement according to claim 14, further comprising a control system for controlling the operation of the or each electronic filter.

16. A magnetic gear arrangement according to claim 15, wherein said control system comprises a magnetic field sensor.

17. A magnetic gear arrangement as claimed in claim 14 wherein the active filter is configured to reduce the strength of the fundamental component of the magnetic flux.

18. A magnetic gear arrangement as claimed in claim 14 wherein the active filter comprises an amplifier.

19. A magnetic gear arrangement according to claim 14, wherein said wiring is a coil.

20. A magnetic gear arrangement according to claim 14, wherein a variation in said coupling varies the gear ratio between said first gear member and said second gear member.

21. A magnetic gear arrangement according to claim 14, wherein said first gear member and said second gear member are both gear rotors.

22. A magnetic gear arrangement according to claim 14, wherein said wiring is further electrically connected to an additional electronic filter.

23. A magnetic gear arrangement according to claim 14, wherein said wiring is connected to an impedance.

24. A magnetic gear arrangement according to claim 14, further comprising means for applying a voltage across said electronic filter.

25. A magnetic gear arrangement according to claim 14, wherein said electronic filter is configured to filter out a component of the magnetic flux at said interpole.

26. A magnetic gear arrangement according to claim 25, wherein said component of the magnetic flux is a fundamental component.

27. A magnetic gear arrangement according to claim 25, said magnetic gear arrangement being configured to generate power from said filtered component of the magnetic flux.

28. A magnetic gear arrangement according to claim 14, wherein the first gear member comprises permanent magnets and the second gear member comprises permanent magnets.

* * * * *